(12) United States Patent
Kotler

(10) Patent No.: US 10,220,336 B2
(45) Date of Patent: Mar. 5, 2019

(54) FILTER EMPLOYING STACK OF FILTER DISKS

(71) Applicant: FILTER ART LTD, Metula (IL)

(72) Inventor: Amihai Kotler, Metula (IL)

(73) Assignee: FILTER ART LTD., Metula (IL)

( * ) Notice: Subject to any disclaimer, the term of this patent is extended or adjusted under 35 U.S.C. 154(b) by 0 days.

(21) Appl. No.: 15/323,438

(22) PCT Filed: Aug. 31, 2015

(86) PCT No.: PCT/IL2015/050877
§ 371 (c)(1),
(2) Date: Jan. 3, 2017

(87) PCT Pub. No.: WO2016/030903
PCT Pub. Date: Mar. 3, 2016

(65) Prior Publication Data
US 2017/0165597 A1    Jun. 15, 2017

Related U.S. Application Data

(60) Provisional application No. 62/044,250, filed on Aug. 31, 2014.

(51) Int. Cl.
*B01D 33/50*  (2006.01)
*B01D 33/39*  (2006.01)
(Continued)

(52) U.S. Cl.
CPC ........... *B01D 33/503* (2013.01); *B01D 33/15* (2013.01); *B01D 33/21* (2013.01); *B01D 33/23* (2013.01);
(Continued)

(58) Field of Classification Search
CPC .... B01D 33/503; B01D 33/80; B01D 35/153; B01D 33/15; B01D 33/39; B01D 2201/082
(Continued)

(56) References Cited

U.S. PATENT DOCUMENTS 2,964,194 A * 12/1960 Oliver, Jr. ............. B01D 33/23
                                                        210/331
5,855,799 A *  1/1999 Herrmann ........... B01D 17/045
                                                        210/780
(Continued)

FOREIGN PATENT DOCUMENTS

DE      2503656      1/1976
DE     19811255     12/1998
(Continued)

*Primary Examiner* — Madeline Gonzalez
(74) *Attorney, Agent, or Firm* — Mark M. Friedman

(57) ABSTRACT

A filter for filtering a flow of liquid a filter assembly with a number of filter disks coaxially arrayed along a central flow path within a pressure vessel. Each filter disk has a number of segments. The segments are preferably implemented as spacers with outward-facing filler screen support configurations supporting first and second filter screens. The filter screen support configurations have a cellular form that is open over a majority of a surface area, An arrangement of support ribs are deployed to maintain a spacing between the first and second filter screen support configurations. At least 80 percent of an internal volume of each of the segments is preferably open to allow liquid flow from the screens to the central flow path. Also disclosed are modular structure's of the filter disks, and a backwash arrangement which performs a spiral scanning motion across the surface of each filter disk.

11 Claims, 19 Drawing Sheets

(51) Int. Cl.
  *B01D 33/15* (2006.01)
  *B01D 33/80* (2006.01)
  *B01D 33/23* (2006.01)
  *B01D 33/21* (2006.01)
  *B01D 35/153* (2006.01)

(52) U.S. Cl.
  CPC .............. *B01D 33/39* (2013.01); *B01D 33/80* (2013.01); *B01D 35/153* (2013.01); *B01D 2201/082* (2013.01)

(58) Field of Classification Search
  USPC .......... 210/391, 314, 333.01, 346, 347, 393, 210/411, 425
  See application file for complete search history.

(56) References Cited

U.S. PATENT DOCUMENTS

| | | |
|---|---|---|
| 6,090,298 A | 7/2000 | Weis |
| 6,294,098 B1 | 9/2001 | Bergmann |
| 9,314,718 B2 | 4/2016 | Mauda et al. |
| 2015/0265951 A1* | 9/2015 | Frommann ........ B01D 29/6438 210/323.1 |

FOREIGN PATENT DOCUMENTS

| | | |
|---|---|---|
| JP | 3411100 | 5/2003 |
| WO | 2004/096411 | 11/2004 |

* cited by examiner

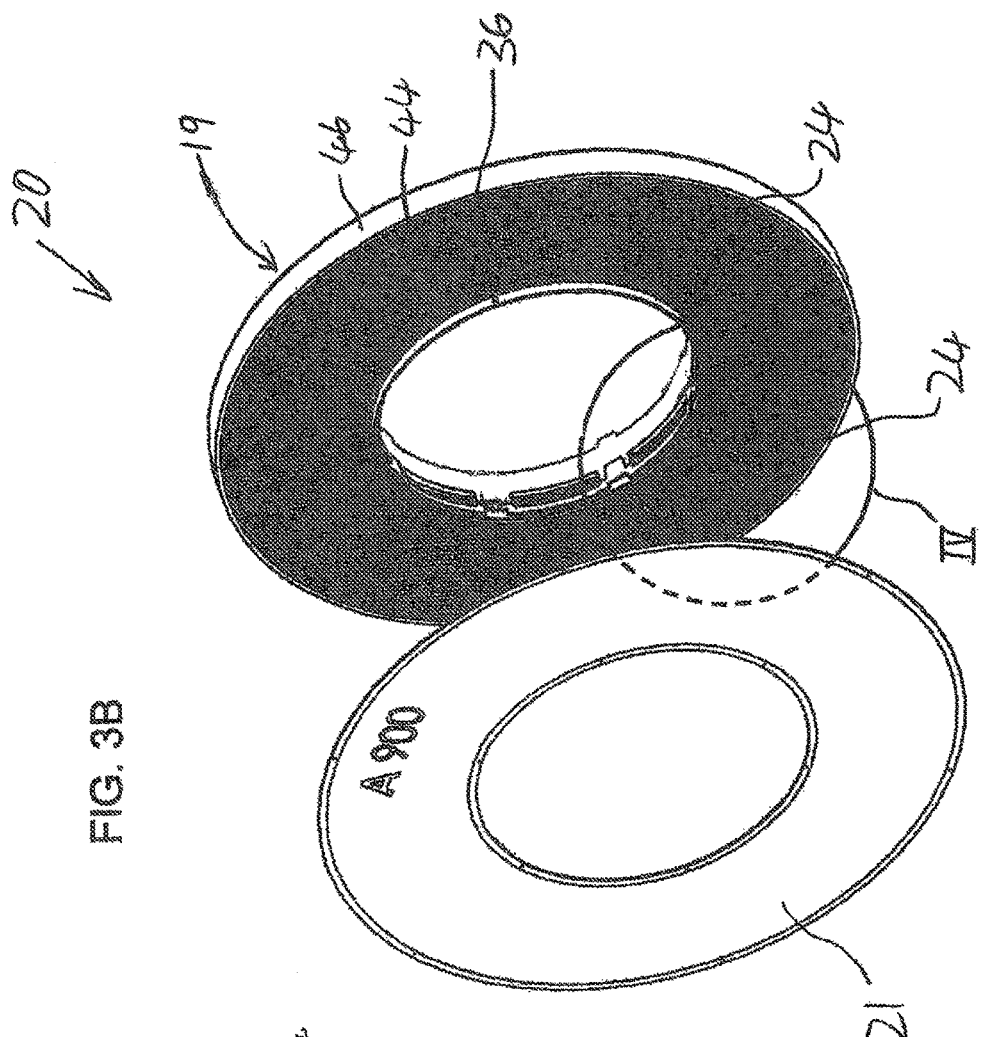
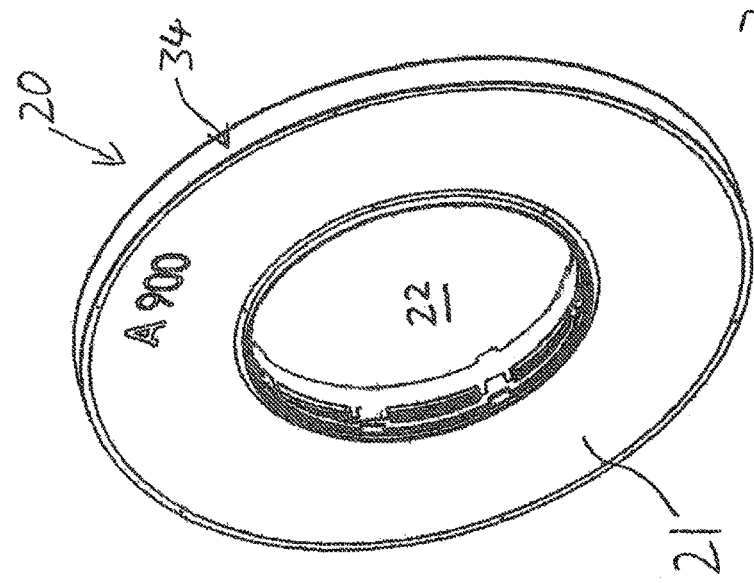
FIG. 3A
FIG. 3B

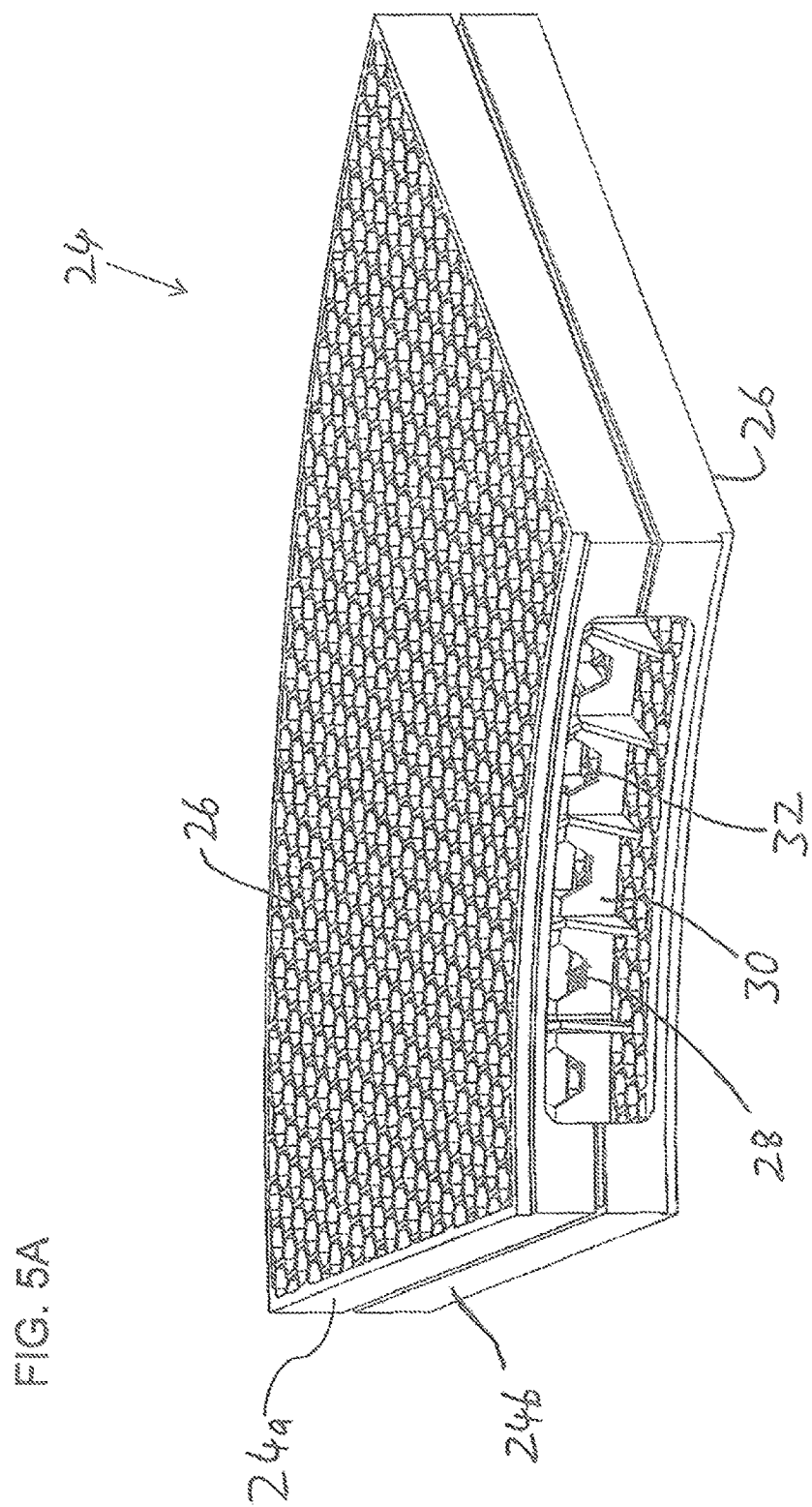

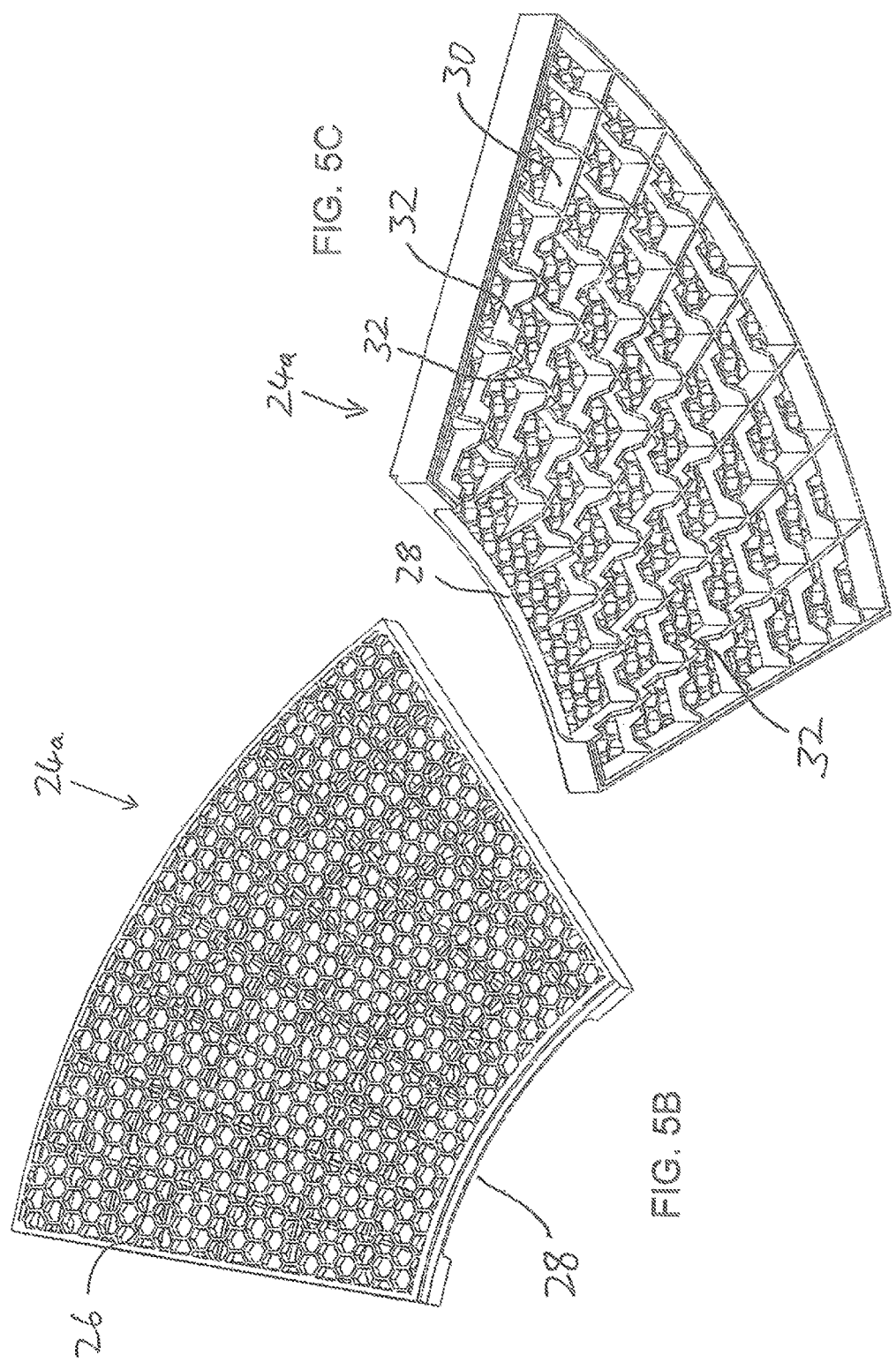

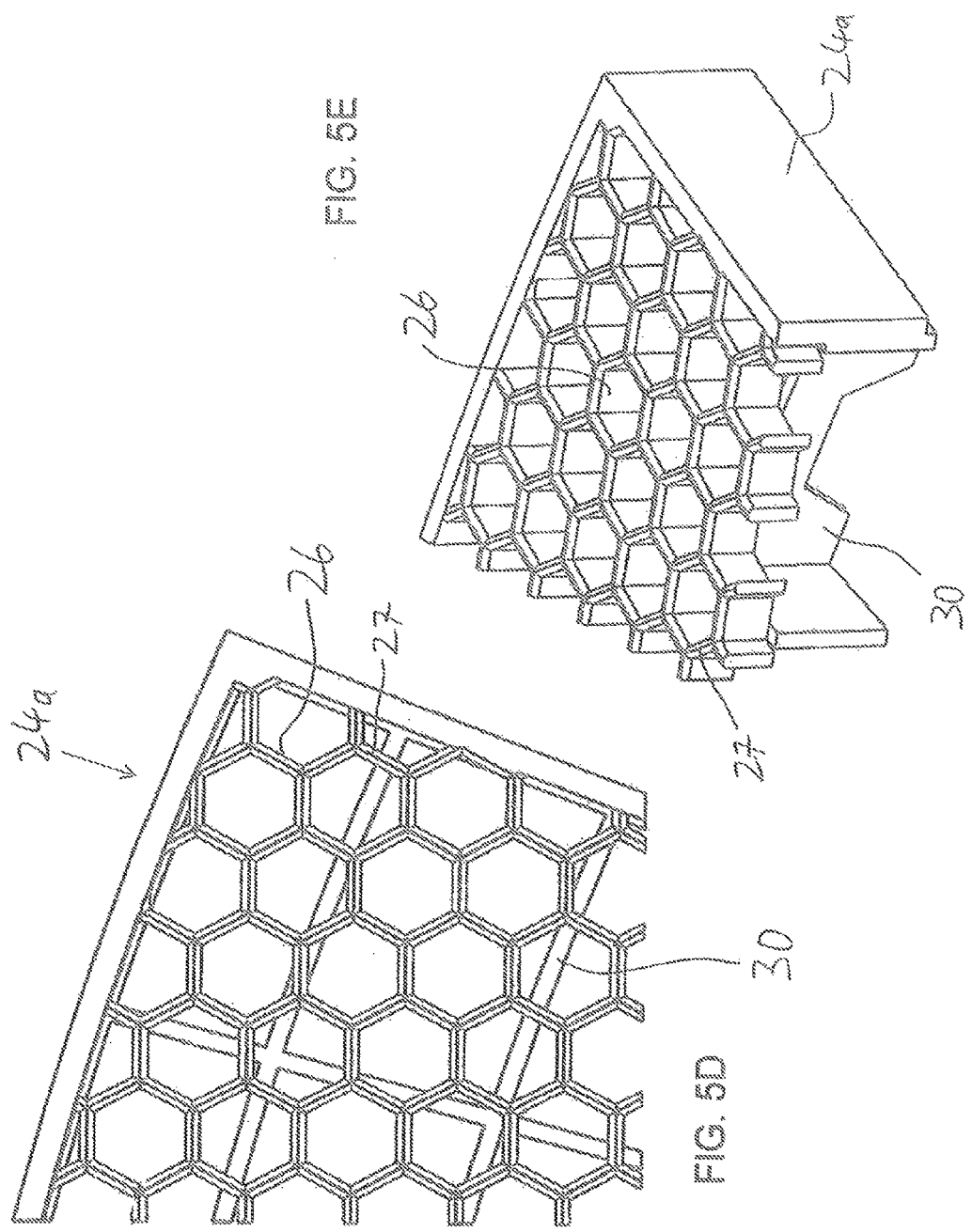

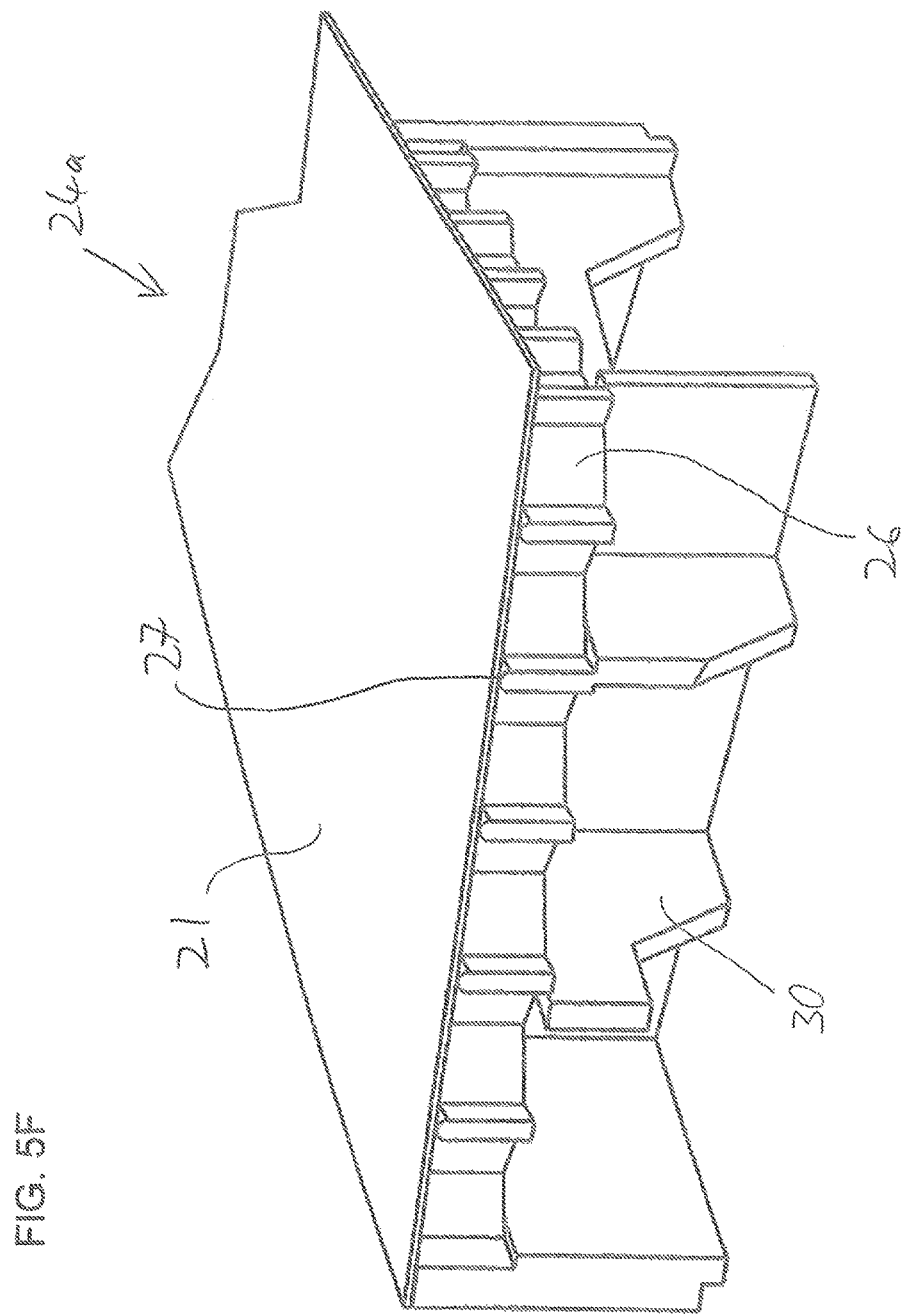

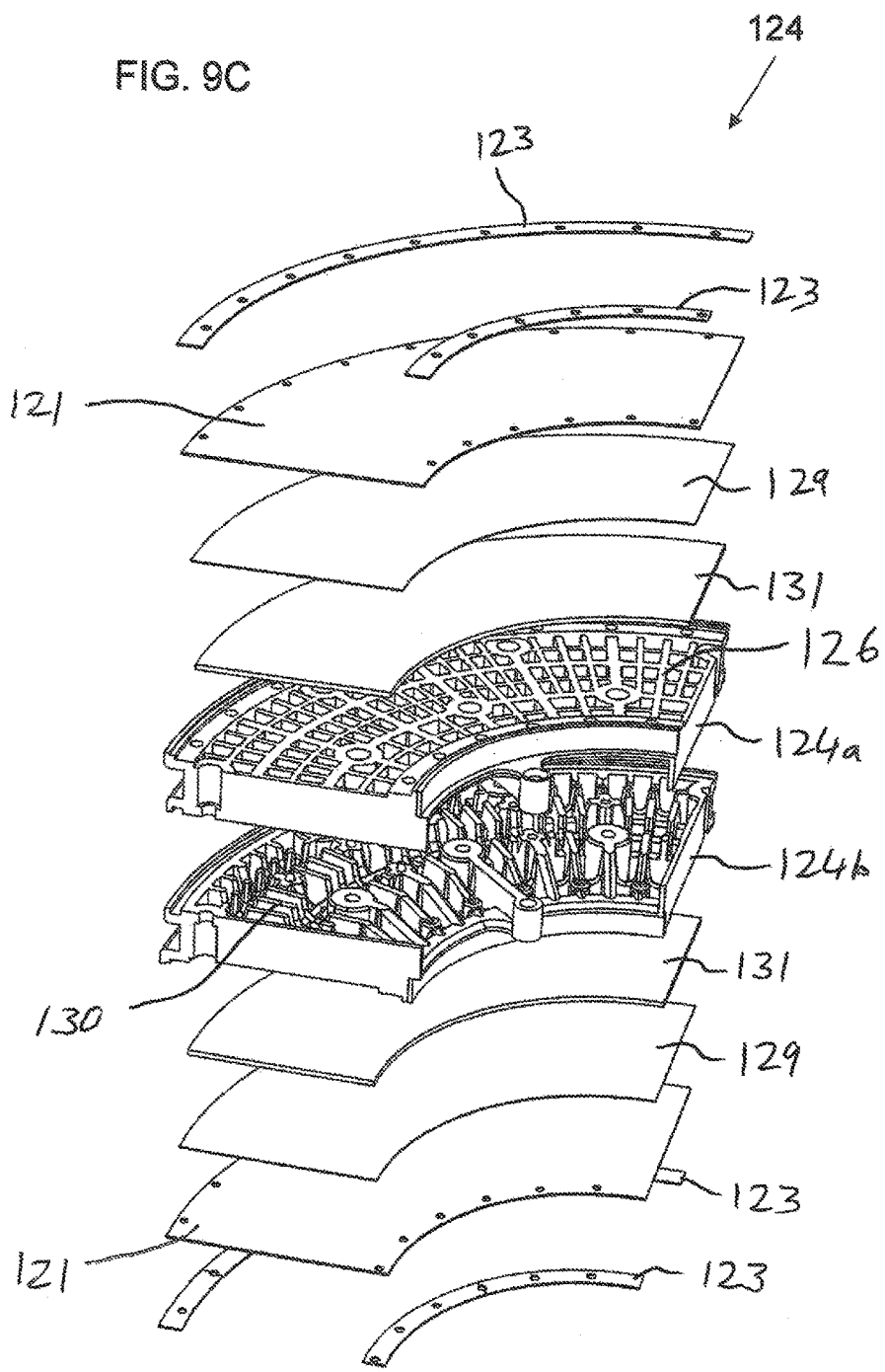

FILTER EMPLOYING STACK OF FILTER DISKS

FIELD AND BACKGROUND OF THE INVENTION

The present invention relates to filters and, in particular, it concerns a filter structure employing a stack of filter disks fully immersed within a pressure vessel.

It is known to provide in-line filtering of liquids, such as water, to remove particles down to a desired size. A common configuration for such filters is to employ a cylindrical filter screen immersed in liquid within a pressure vessel, where liquid is forced to flow outwards through the screen. An examples of such a structure is disclosed in patent publication GB 1485989. This cylindrical filter screen configuration is simple to implement, but provides relatively low filter screen area for a given volume of pressure vessel.

U.S. Pat. No. 5,855,799 proposes various more compact configurations in which a larger filter screen surface can be presented in a smaller pressure vessel volume. For example, FIG. 3 of the '799 patent presents an arrangement in which a stack of filter disks are mounted on a common axial outlet pipe within a pressure vessel.

SUMMARY OF THE INVENTION

The present invention is a filter for filtering a flow of liquid.

According to the teachings of an embodiment of the present invention there is provided, a filter for filtering a flow of liquid, the filter comprising: (a) a pressure vessel having an inlet and an outlet; and (b) a filter assembly deployed within the pressure vessel, the filter assembly comprising a plurality of filter disks coaxially arrayed along a central flow path in fluid communication with the outlet, each of the filter disks comprising a spacer having first and second outward-facing filter screen support configurations, and having an outlet for flow of filtered liquid inwards to the central flow path, the first and second filter screen support configurations of the spacer supporting first and second filter screens forming corresponding first and second surfaces of each filter disk, wherein the filter screen support configurations have a cellular form that is open over a majority of a surface area, the spacer further comprising an arrangement of support ribs deployed to maintain a spacing between the first and second filter screen support configurations.

According to a further feature of an embodiment of the present invention, at least 20 percent of an internal volume of each of the spacers is open to allow liquid flow from the screens to the central flow path.

According to a further feature of an embodiment of the present invention, the first outward-facing filter screen support configuration of each of the spacers is formed from at least one half-thickness first spacer segment, and wherein the second outward-facing filter screen support configuration of each of the spacers is formed from at least one half-thickness second spacer segment, the first and second spacer segments having complementary sets of the support ribs cooperating when assembled to maintain the spacing between the first and second filter screen support configurations.

According to a further feature of an embodiment of the present invention, each of the spacers is formed from a single annular first spacer segment and a single annular second spacer segment.

According to a further feature of an embodiment of the present invention, each of the spacers is formed from a plurality of first spacer segments and a plurality of second spacer segments.

According to a further feature of an embodiment of the present invention, the filter screen support configuration is formed with a quadrilateral or hexagonal cellular form.

According to a further feature of an embodiment of the present invention, the first and second filter screens are attached to the filter disks only around a periphery of the filter screens.

According to a further feature of an embodiment of the present invention, the filter assembly is rotatably mounted so as to be rotatable about a central axis, the filter further comprising a backwash assembly comprising: (a) a backwash arm extending between adjacent of the plurality of filter disks, the backwash arm terminating in a suction nozzle in facing relation to one of the first and second filter screens; (b) a pivot arrangement for accommodating motion of the backwash arm so as to bring the suction nozzle into close contact with the one of the first and second filter screens; and (c) a drive arrangement configured to simultaneously rotate the filter assembly about the central axis and displace the backwash arm so that the suction nozzle moves through a range of radial positions on the filter disk, thereby causing the suction nozzle to follow a spiral tracking motion across a surface of the filter disk.

According to a further feature of an embodiment of the present invention, the suction nozzle is part of a suction head located at a distal end of the backwash arm, the suction head further comprising at least one rotatable roller deployed to provide rolling contact with the one of the first and second filter screens.

According to a further feature of an embodiment of the present invention, the backwash arm is one of a pair of backwash arms inserted between a pair of adjacent filter disks, and wherein the pivot arrangement is configured to accommodate motion of a first of the backwash arms to contact a second filter screen of a first filter disk and a second of the backwash arms to contact a first filter screen of a second filter disk.

According to a further feature of an embodiment of the present invention, the drive arrangement is configured to generate rotation of the filter assembly and reciprocating motion of the suction nozzle from unidirectional rotation of a single motor.

There is also provided according to the teachings of an embodiment of the present invention, a filter for filtering a flow of liquid, the filter comprising: (a) a pressure vessel having an inlet and an outlet; (b) a filter assembly deployed within the pressure vessel, the filter assembly comprising a plurality of filter disks coaxially arrayed along a central flow path in fluid communication with the outlet, the filter assembly being rotatably mounted so as to be rotatable about a central axis, each of the filter disks comprising: (i) a support element, and (ii) a spacer supported by the support element, the spacer having first and second filter screen support configurations, and having an outlet for flow of filtered liquid inwards to the central flow path, the first and second filter screen support configurations of the spacer supporting first and second filter screens forming corresponding first and second surfaces of each filter disk; and (c) a backwash assembly comprising: (i) a backwash arm extending between adjacent of the plurality of filter disks, the backwash arm terminating in a suction nozzle in facing relation to one of the first and second filter screens, (ii) a pivot arrangement for accommodating motion of the backwash arm so as to bring the suction nozzle into close contact with the one of the first and second filter screens, and (iii) a drive arrangement configured to simultaneously rotate the filter assembly about the central axis and displace the backwash arm so that the suction nozzle moves through a range of radial positions on the filter disk, thereby causing the suction nozzle to follow a spiral tracking motion across a surface of the filter disk.

According to a further feature of an embodiment of the present invention, the suction nozzle is part of a suction head located at a distal end of the backwash arm, the suction head further comprising at least one rotatable roller deployed to provide rolling contact with the one of the first and second filter screens.

According to a further feature of an embodiment of the present invention, the backwash arm is one of a pair of backwash arms inserted between a pair of adjacent filter disks, and wherein the pivot arrangement is configured to accommodate motion of a first of the backwash arms to contact a second filter screen of a first filter disk and a second of the backwash arms to contact a first filter screen of a second filter disk.

According to a further feature of an embodiment of the present invention, the drive arrangement is configured to generate rotation of the filter assembly and reciprocating motion of the suction nozzle from unidirectional rotation of a single motor.

According to a further feature of an embodiment of the present invention, the pivot arrangement comprises a biasing arrangement deployed for biasing the backwash arm so as to press the suction nozzle towards the one of the first and second filter screens.

BRIEF DESCRIPTION OF THE DRAWINGS

The invention is herein described, by way of example only, with reference to the accompanying drawings, wherein:

FIG. 3A is an isometric view of a filter disk from the filter of FIG. 2A;

FIG. 3B is an isometric view of the filter disk of FIG. 3A with a filter screen separated from the underlying structure;

FIG. 5A is an enlarged isometric view of a filter screen support segment from the filter disk of FIG. 3A;

FIGS. 5B and 5C are isometric views of the outward-facing and inward-facing surfaces, respectively, of one half of the filter screen support segment of FIG. 5A;

FIGS. 5D and 5E are an enlarged partial plan view and an enlarged partial isometric view, respectively, of a part of the segment of FIG. 5B;

FIG. 5F is an isometric partial view of the filter screen support segment of FIG. 5E with a filter screen deployed thereon;

FIG. 9C is an exploded isometric view of the filter disk segment of FIG. 9A;

DESCRIPTION OF THE PREFERRED EMBODIMENTS

Figure 1:
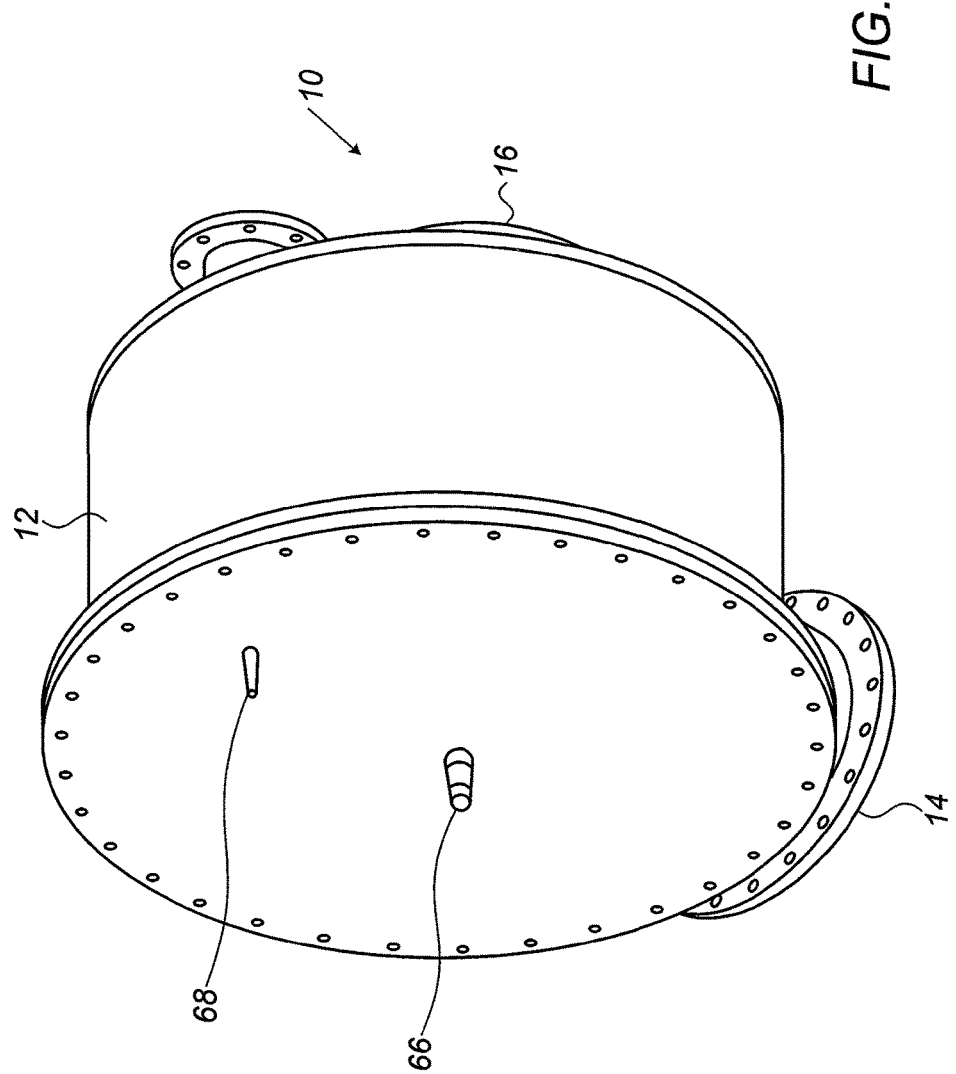
FIG. 1 is an isometric view of a filter, constructed and operative according to an embodiment of the present invention.

The present invention is a filter, and corresponding subsystems thereof and associated methods.

The principles and operation of filters according to the present invention may be better understood with reference to the drawings and the accompanying description.

Referring now to the drawings, FIGS. 1-7 illustrate various features of a filter, generally designated 10, constructed and operative according to a first preferred but non-limiting exemplary embodiment of the present invention, for filtering a flow of liquid such as water. FIGS. 8-13B illustrate various features of a filter, generally designated 100, constructed and operative according to a second preferred but non-limiting exemplary embodiment of the present invention, for filtering a flow of liquid such as water. Filter 100 is generally similar to filter 10 such that the following description should be considered generic to both embodiments except where specifically pointed out otherwise, with reference numerals for components of filter 100 corresponding to the reference numerals used in description of filter 10 with 100 added to each number. It should be noted that, throughout this document, the term "water" may be used interchangeably with "liquid" as a typical example, but the invention is not limited to use with water, and may equally be used with brine, other water-based solutions, and in non-water-based applications such as in the petrochemical industry.

Figure 4:
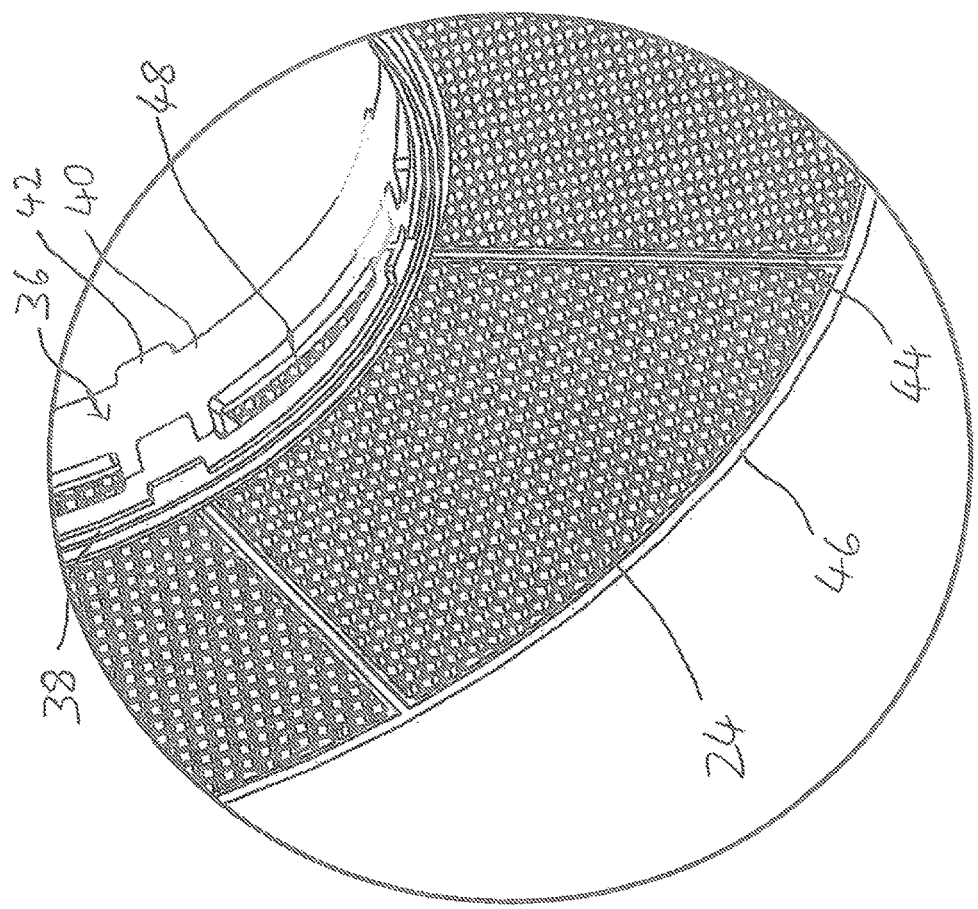
FIG. 4 is an enlarged view of the region of FIG. 3B designated IV.

In general terms, filter 10 includes a pressure vessel 12 having an inlet 14 and an outlet 16. Within pressure vessel 12, as seen in FIG. 2, a filter assembly 18 includes a plurality of filter disks 20 coaxially arrayed along a central flow path 22 that is in fluid communication with outlet 16. Each filter disk 20 is formed as a spacer 19, optionally formed from a plurality of filter screen support segments 24, which provides flat annular support surfaces for first and second filter screens 21 overlaying opposite surfaces of filter disk 20. Each spacer also features one or more outlet 28 for flow of filtered liquid inwards to the central flow path 22, all as best seen in FIGS. 3A-4. When assembled, these first and second filter screens 21 form corresponding first and second surfaces of each filter disk 20.

A number of different aspects of filter 10 are believed to be of patentable significance, each in its own right, and to be of particular value when used in synergy. Some of these features are presented below.

Filter Screen Support Structure

By way of introduction to this aspect of the invention, it should be noted that preferred implementations of the present invention are pressurized systems operating at pressures typically in the range of 1-20 atmospheres (where non-pressurized systems are referred to as being at zero pressure), and in many cases more than 6 atmospheres, requiring corresponding implementation using a pressure vessel 12, as mentioned above. The use of closed pressurized system allows much higher filter throughput than can be achieved with open systems, where any pressure differential (e.g., suction) driving liquid through the filter is inherently limited to about 0.4 atmosphere.

The use of high liquid pressure together with large area filter disks leads to very large compression loads on the filter spacer. For example, each square centimeter experiences approximately 1 kg force from each face of the filter for each atmosphere of pressure differential across the filter. For a filter with surface area of 1 square meter, corresponding to 5,000 square centimeters on each face, the disk experiences compressive forces equivalent to a load of 10 tons (10,000 kg force) per atmosphere of pressure differential. If the screen were to become temporarily clogged with excess suspended solids at a working pressure of 6 atmospheres, the total compressive force on the spacer would be approximately 60 tons. At the same time, in order to minimize energy losses and maximize throughput, the flow impedance of liquid passing through the filter segment to the central flow path 22 should be minimized as much as possible, requiring a structure with large flow passages.

Figure 9A:
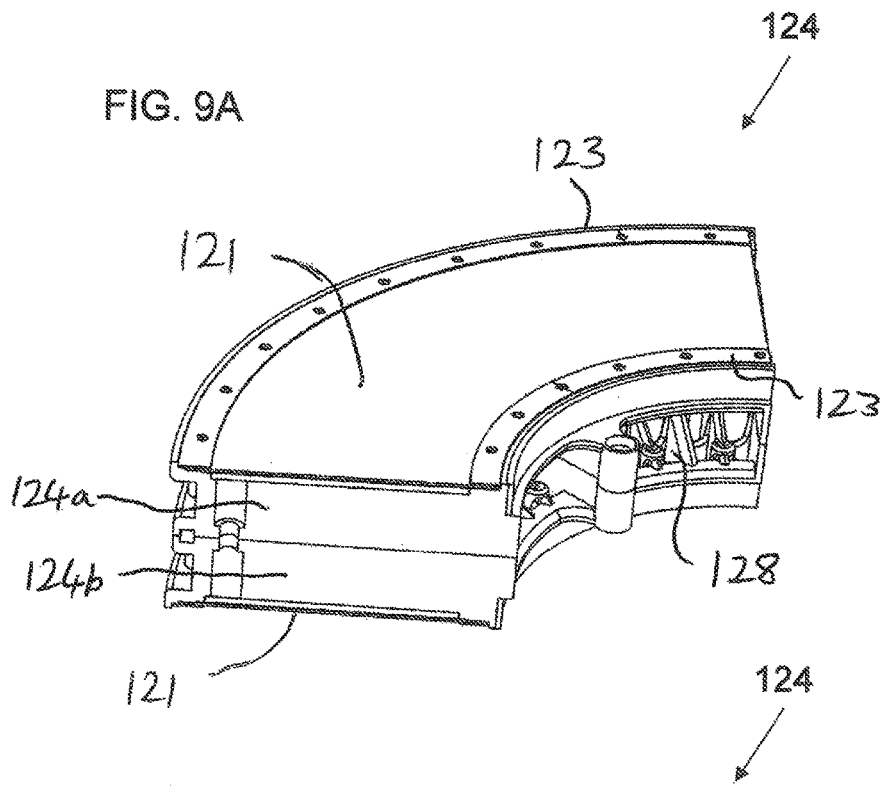
FIGS. 9A and 9B are two isometric views of a filter disk segment from the filter of FIG. 8.
Figure 10:
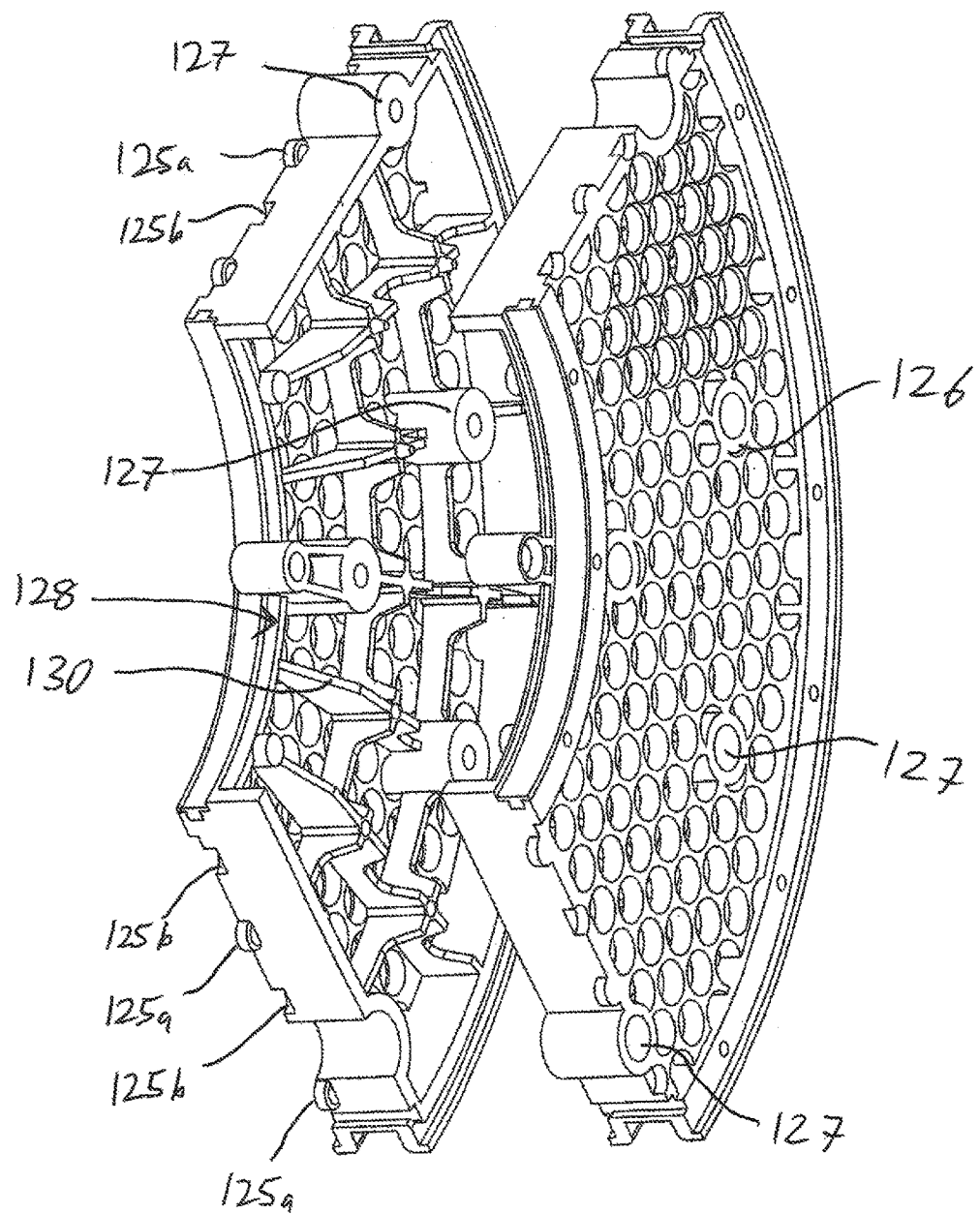
FIG. 10 is an exploded isometric view of an alternative implementation of a two-part spacer segment structure for use in the filter of FIG. 8.
Figure 11A:
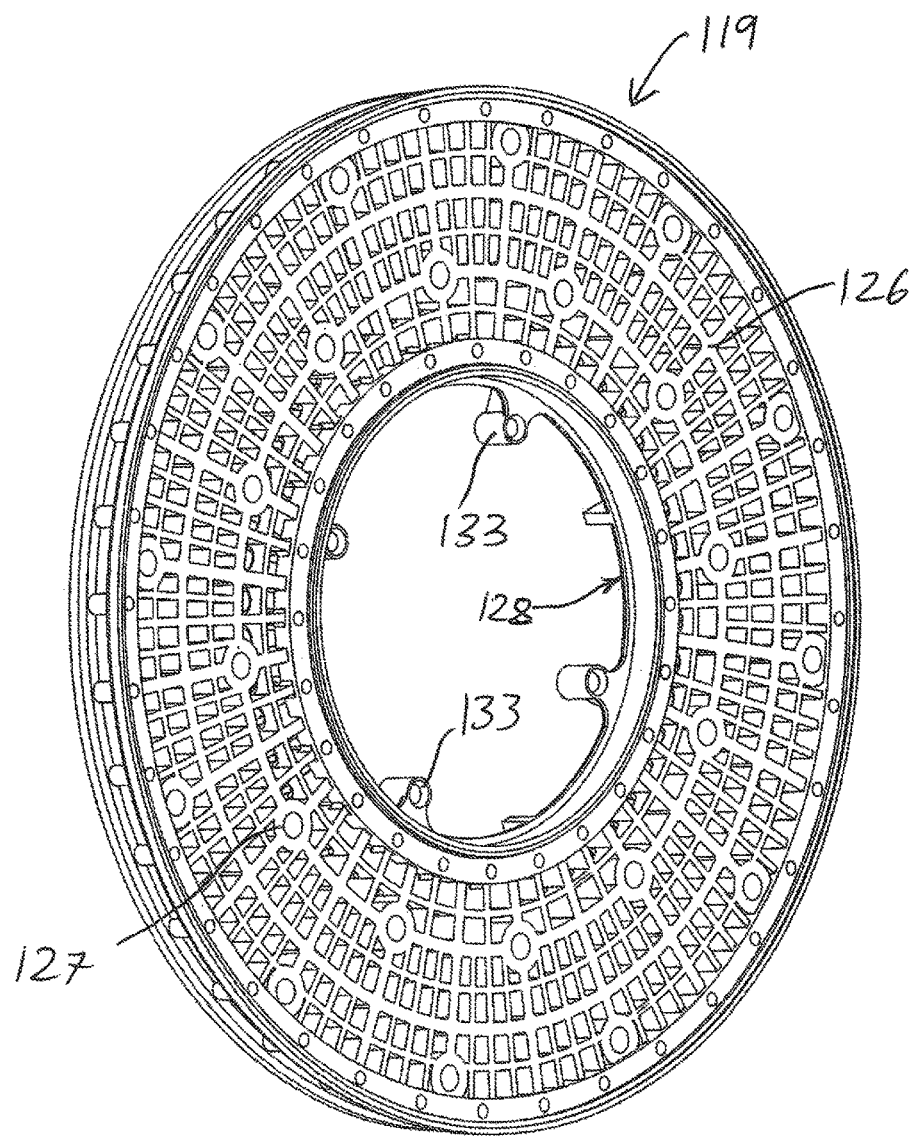
FIGS. 11A and 11B are front and back isometric views, respectively, of an annular half-thickness spacer for use in an alternative implementation of the filter disks of filter of FIG. 8.
Figure 11B:
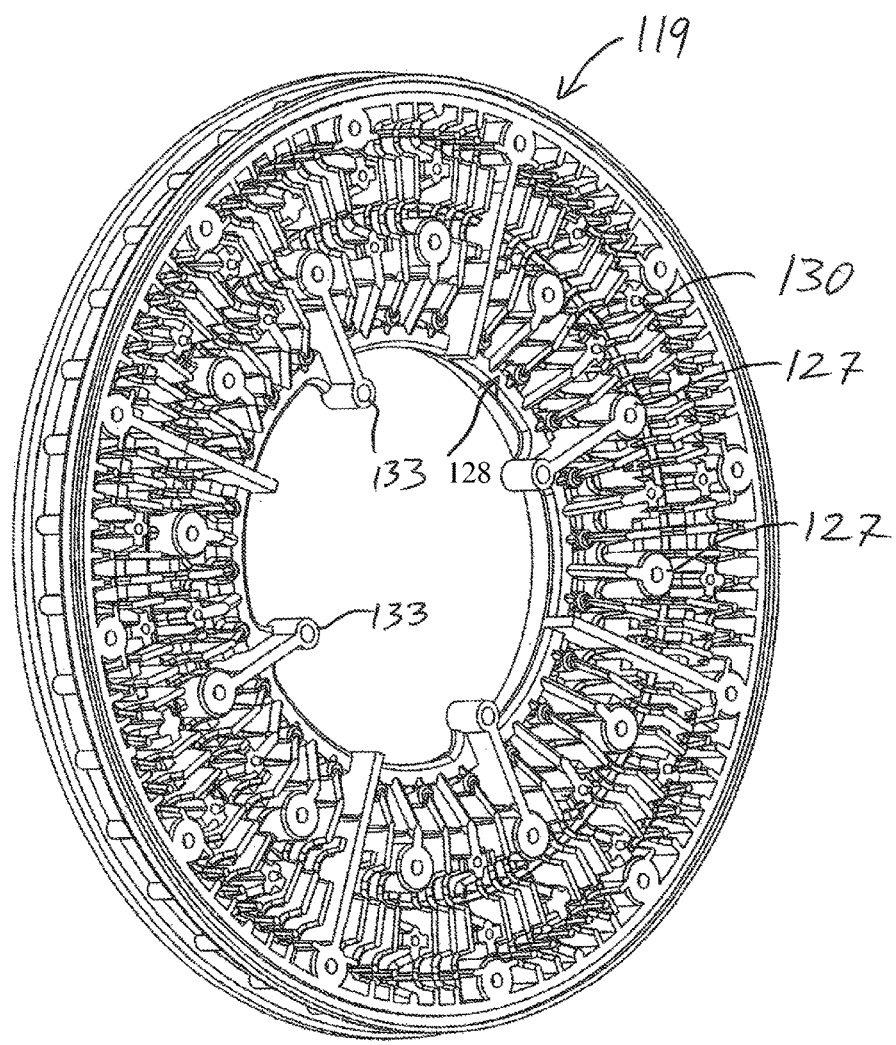

In order to address these conflicting considerations, according to certain preferred implementations of the present invention, each filter segment 24 is implemented as a spacer, preferably although not necessarily formed from polymer material, having first and second screen support configurations 26 supporting the first and second filter screens 21, respectively. Screen support configurations 26 are most preferably formed with a cellular form that is open over a majority of a surface area, as best seen in FIGS. 5A, 5B and 5D. In the particularly preferred but non-limiting example of FIGS. 5A-5F, screen support configuration 26 is formed with a hexagonal cellular form, i.e., where each cell approximates to an open-ended hexagonal tube formed from six flat walls each shared in common with one of six nearest neighboring cells. Other examples include, but are not limited to roughly quadrilateral cellular forms formed by intersecting radial and arcuate ribs as illustrated in FIGS. 9C, 11A and 11B, and round cellular forms such as illustrated in FIG. 10. The cell walls preferably extend perpendicular to the surface. These structures are highly effective at providing rigid structural support combined with minimum flow resistance for liquid passing through the overlying filter screen.

According to one particularly preferred option illustrated in FIGS. 5D-5F, the outward-facing edges 27 of the cellular structure of support configuration 26 are formed with rounded or otherwise tapered edges towards the surface, thereby reducing the contact surface area with the filter screen 21 to increase the unobstructed surface area of the filter screen which is available to take part in the filtering process. According to an alternative preferred option illustrated in FIG. 9C, one or more layers 129 and 131 of mesh may be interposed between support configuration 126 and filter screen 121, thereby providing additional support for the filter screen and spacing the filter screen slightly from the surface of support configuration 26.

The spacer is preferably formed with an arrangement of support ribs 30 deployed to maintain a desired spacing between the first and second screen support configurations 26. In a particularly preferred but non-limiting implementation as illustrated here, each filter segment 24 is formed from two halves 24a, 24b having complementary sets of support ribs 30 which cooperate when assembled to maintain the spacing between the first and second screen support configurations 26. It will be noted that one-piece implementations of filter segment 24 are also within the scope of the invention.

As best seen in FIG. 5B, support ribs 30 are formed with a pattern of openings 32 which provide major flow paths running at least in a direction radially inwards towards the filter segment outlet 28, thereby allowing low flow-impedance drainage of filtered liquid to the central flow path 22. Altogether, in the interests of minimizing flow impedance, the structure of filter segment 24 is preferably such that at least 20 percent, and most preferably more than 70 percent, of an internal volume of each of the filter segments is open to allow liquid flow from the screens to the central flow path. In other words, the total volume of the polymer material making up each filter segment preferably occupies less than 80 percent of the total volume, and in most preferred cases, less than 30 percent.

Figure 9B:
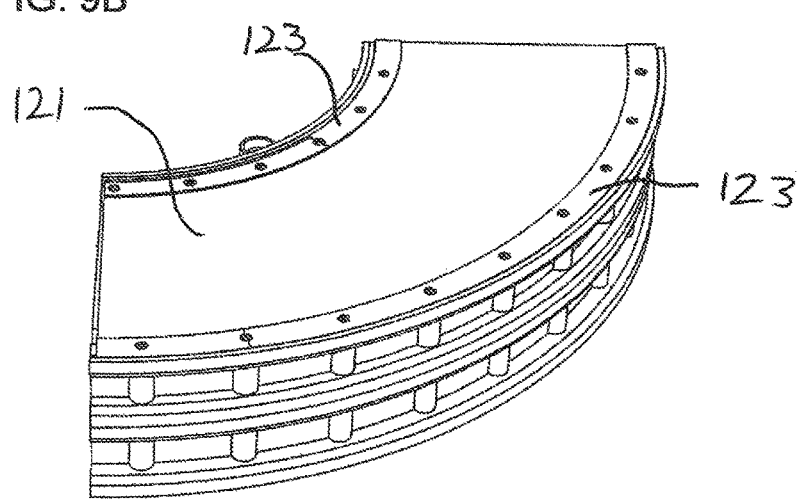

In certain particularly preferred implementations of the present invention, the filter screen is a metal screen. In this case, attachment of the filter screen 21 to filter disk 20 may advantageously be achieved by "welding", used here as a generic term for any connection achieved by any process which causes attachment by bringing two materials together while one or both of the materials is melted or softened. This "welding" can readily be achieved for example by a process of application of heat with slight pressure of the screen against a thermoplastic polymer, or by ultrasonic welding. Additionally, or alternatively, attachment may be achieved using various adhesives and/or by additional mechanical clamping configurations, such as clips, holding the filter screen in place. One example of use of mechanical clamping is illustrated in FIGS. 9A-9C, where clamping strips 123 along the perimeter of the filter screen 121 are fastened to the filter segment 124 by screws, thereby clamping the filter screen in place. Although implementations using a metal filter screen are believed to be particularly advantageous, the various aspects of the present invention can also be implemented to advantage with filter screens made from a range of other materials, such as polymer filter screen materials and various other types of cloth or mesh.

Attachment of the filter screen to filter disk 20 may be at multiple locations across the screen or may be limited to the innermost and outermost peripheral regions of the screen, and any other edges of sections of the filter screen. It will be noted that the normal filter flow of the liquid tends to press the filter screen against the screen support configurations 26, such that attachment of the filter screen need not be continuous across the screen support configuration. However, a backwash arrangement typically would generate forces tending to separate the filter screen from the support configurations. For this reason, it will be noted that there is a particular synergy between the filter segment structure described herein and a preferred implementation of a backwash arrangement to be described below.

In certain preferred implementations of the present invention, continuous annular filter screen layers are employed to cover each face of the filter disks in a single piece. In other cases, however, in view of the wastage of the central portion of the relatively expensive a circular filter screen cut to size for this application, it may be preferable to cover each filter screen support assembly with two or more pieces of filter screen. In this case, the filter screen may be clamped along the joint using clamping strips 123 similar to the peripheral clamping strips described above. Alternatively, slight overlap of the filter screen material may be provided, so long as the overlap is in the trailing direction with regard to motion of the backwash assembly, i.e., that any step encountered by the backwash arrangement is a "downward" step, towards filter disk 120, in the direction of rotation.

Modular Assembly

Turning now to a further feature of certain particularly preferred embodiments of the present invention as best seen in FIGS. 3B and 4, each filter disk 20 preferably includes a filter disk frame 34 configured for receiving a plurality of filter segments 24 so as to maintain filter segments 24 aligned as a disk. As illustrated here, filter disk frame 34 preferably includes a hub 36 defining a section of central flow path 22. Hub 36 is preferably configured to mate with other similar hubs such that the hubs of a stack of filter disks 20 together define central flow path 22 passing through the stack of filter disks 20, as best seen in FIG. 2B.

To achieve sealing interconnection between hubs 36, each hub 36 is preferably formed with a substantially cylindrical outer skirt 38 (FIG. 4) which comes into sealed overlapping relation with a complementary inner skirt 40 on the other side of the hub. Additional axially-projecting interlocking features 42 preferably provide interlocking between adjacent filter disks 20 in a manner that prevents relative rotation between the disks.

In the implementation illustrated here, the remaining structure of frame 34 is formed primarily from radial struts 44 connecting to an outer retaining hoop 46, where portions of hub 36 and hoop 46 between adjacent struts 44 define a receptacle for a filter segment 24. Hub 36 also features a flow path opening 48 for each filter segment 24, for receiving the flow of filtered liquid from filter segment outlet 28.

It will be noted that the use of a filter disk structure which defines a corresponding segment of central flow path 22 provides particular flexibility of design of filter assembly according to the present invention. Specifically, the entire assembly can be scaled up or down to match the flow requirements for a given installation while employing a common set of modular components for assembly and servicing of the system. Thus, a small installation may employ a single filter disk or a pair of filter disks within a suitably sized pressure vessel 12, while a large installation may employ a stack of five or more, and in some cases ten or more, filter disks, in a suitably sized pressure vessel 12. A preferred implementation of a backwash assembly for use in the present invention is also implemented as a modular structure, as will be described below.

Variant Implementations

Although the modular structure described here of filter screen support segments assembled in a frame is believed to be highly advantageous, it should be noted that a range of alternative filter disk structures also fall within the scope of aspects of the present invention. In particular, FIGS. 8-10 relate to implementations of the present invention in which filter segments 124 are configured to directly interconnect with each other to form filter disks 120 without requiring any separate frame. Optionally, as shown in the variant of FIG. 10, the two halves of each filter segment 124 are formed with interlocking complementary projections 125a and recesses 125b which help to ensure correct alignment between adjacent segments, and bolt sockets 127 allow for bolting together of the two halves of the segment and, at the edges of the segments, for bolting each segment to a neighboring segment. Preferably, each segment 124 also features an inwardly-projecting eyelet 133 which receives an alignment rod 135 (FIG. 8) which maintains alignment between the filter disks in the overall filter assembly.

A further option is illustrated in FIGS. 11A and 11B in which a continuous annular filter-screen support surfaces is provided by a unitary molded disk structure, typically implemented as two similar half-thickness annular spacer structures which come together to form the full thickness of the filter disk spacer. In each case, the structure preferably includes all of the above-described features of the cellular screen support structure and internal support ribs, and other structures that support the filter screen as described above.

Figure 8:
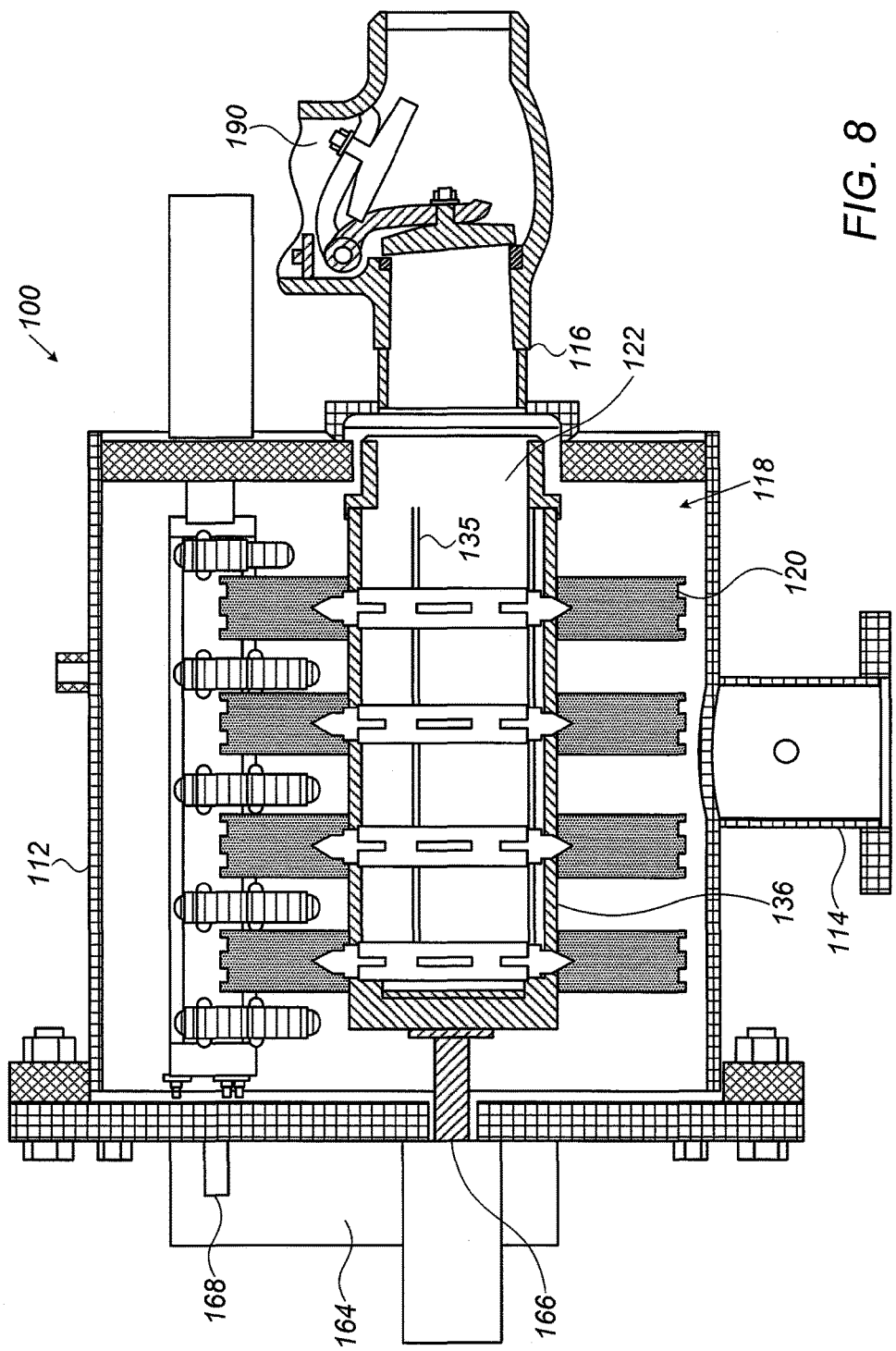
FIG. 8 is a schematic cross-sectional view through a filter, constructed and operative according to a variant embodiment of the present invention.

In the frameless implementations of FIGS. 8-11B, the integrated hub is preferably replaced by simple sections of connecting tube 136 forming a sealing connection between adjacent filter disks 120, as seen in FIG. 8, thereby defining central flow path 122 through the disks. The assembly is preferably clamped together by tightening of alignment rods 135 so as to apply tension, tightening together filter disks 120 and connecting tube sections 136.

Check Valve

An additional preferred feature of the certain embodiments of the present invention illustrated in FIG. 8 is integration of a check valve 190 with the body of the filter, most preferably as part of outlet 116. As mentioned earlier, the filter disk structures withstand large inward operating pressures, but any significant reverse pressure applied over a large area of the filter screens would be at risk of separating the filter screen from the spacer. As a precaution against generation of such a reverse pressure under a wide range of operating conditions, it is advantageous to integrate a check valve 190 together with the filter assembly. Particularly reliable protection against reverse flow is provided by positioning check valve 190 in the outlet flow path. A wide range of types of check valves may be used, with a non-limiting preferred example being a single or double hinged-flap check valve.

Backwash Assembly

In order to allow continuous operation of the filter systems of the present invention, arrangements are made to remove particles which accumulate on the filter screen during operation. Unlike open (atmospheric pressure) systems in which cleaning of a filter element may be achieved by use of spray jets or the like, screen cleaning in a closed pressurized system is performed by backwash of water in a reverse direction through the screen. In order to enable effective backwash of the entire filter surface and to avoid wastage of energy, a backwash nozzle needs to be brought into close proximity with the screen surface. Particularly in the parallel filter disk stack configuration of the present invention, this requirement is non-trivial to achieve.

One exemplary approach to achieving backwash cleaning in a stacked arrangement of filter disks is described in the aforementioned U.S. Pat. No. 5,855,799. In that case, a fixed backwash configuration is deployed on each side of the disk, spanning the entire radial dimension of the disk. This results in obstruction of a significant surface area of the screen at any moment.

In contrast, certain preferred implementations of the present invention provide backwash nozzles located at the end of movable arms which, together with rotation of the filter disks, achieves a spiral backwash scanning path across the surface of the filter disk screens. This structure will now be described in more detail.

Figure 2A:
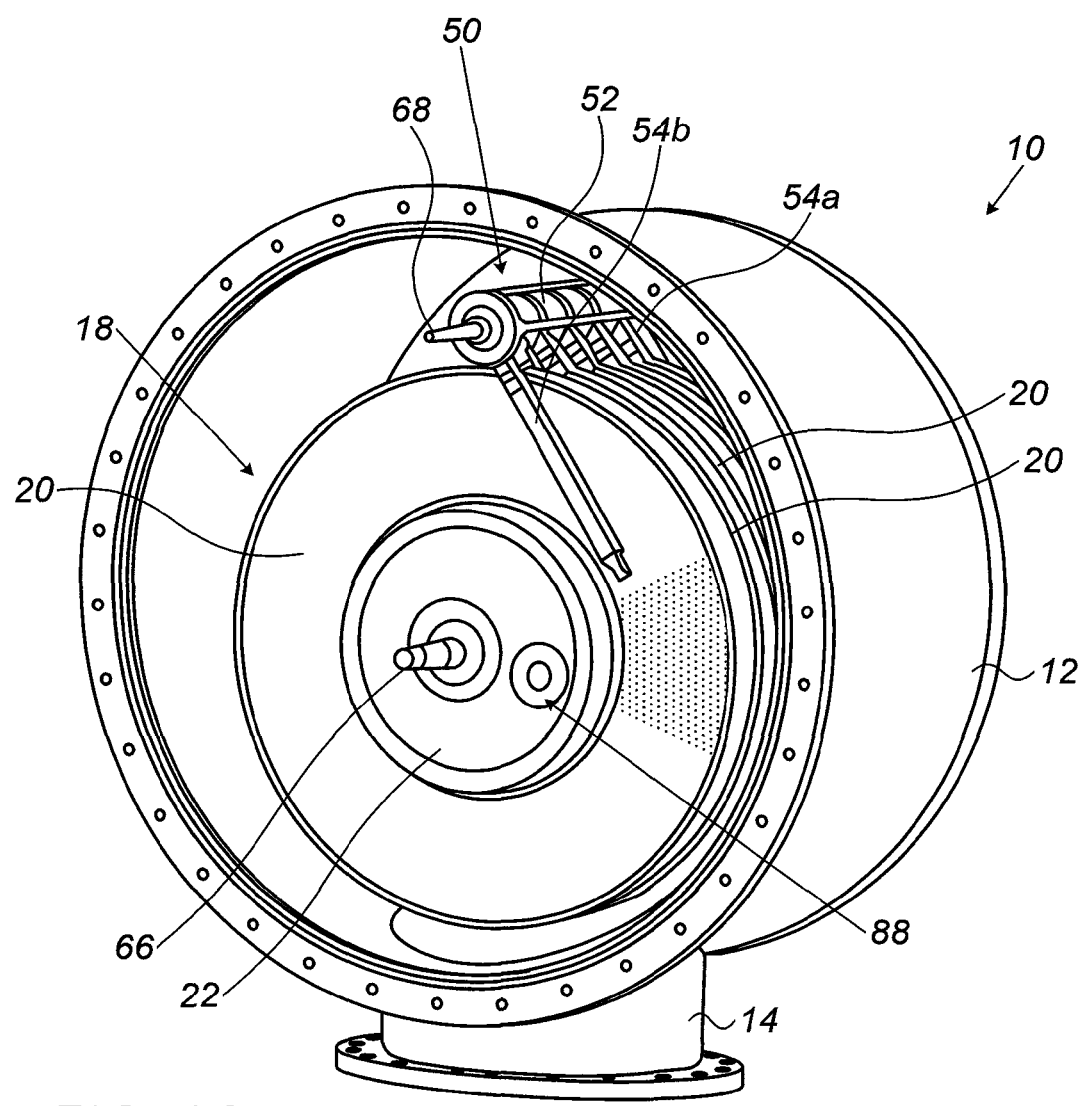
FIG. 2A is an isometric view of the filter of FIG. 1 showing part of the outer casing removed.
Figure 2B:
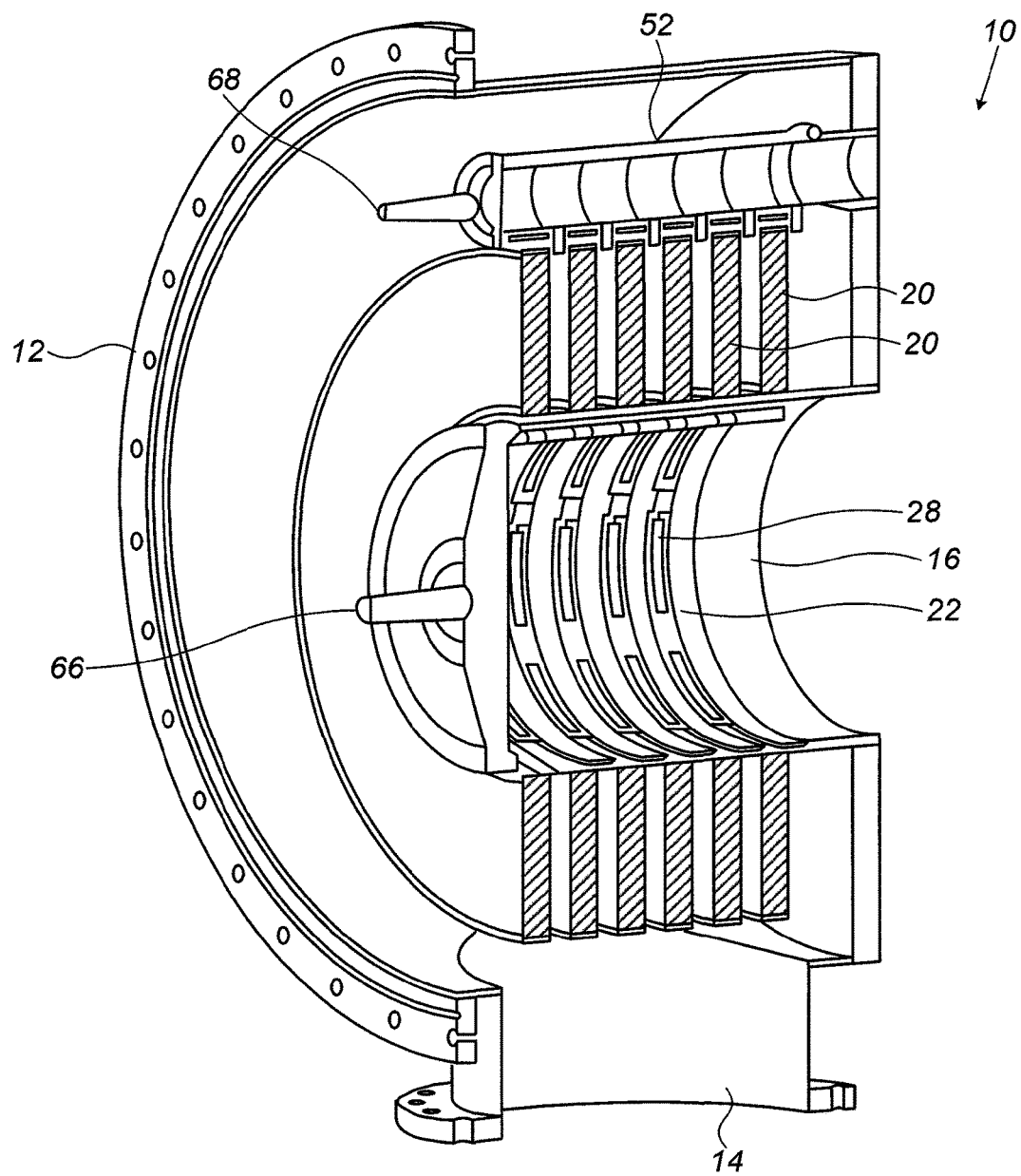
FIG. 2B is a cut-away isometric view of the filter of FIG. 2A.

Referring first to FIG. 2A, a backwash assembly according to a preferred implementation of this aspect of the present invention is generally designated 50. Backwash assembly 50 is here formed from a backwash exhaust conduit 52 from which there project a set of backwash arms 54a, 54b. Backwash arms 54a and 54b extend between neighboring filter disks 20. A preferred implementation of a backwash arm 54 with a corresponding segment of conduit 52 is shown in more detail in FIG. 6A.

Figure 6A:
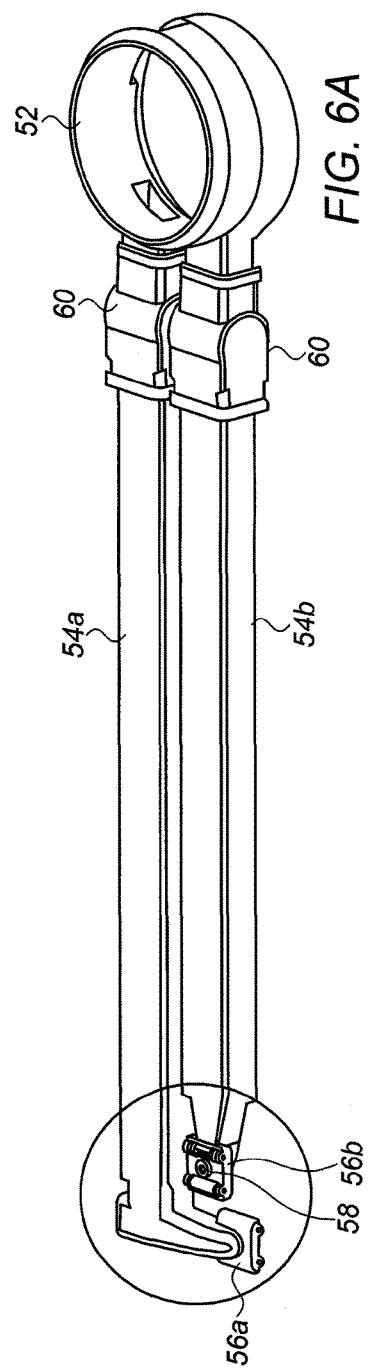
FIG. 6A is an isometric view of part of a backwash assembly from the filter of FIG. 1.
Figure 6B:
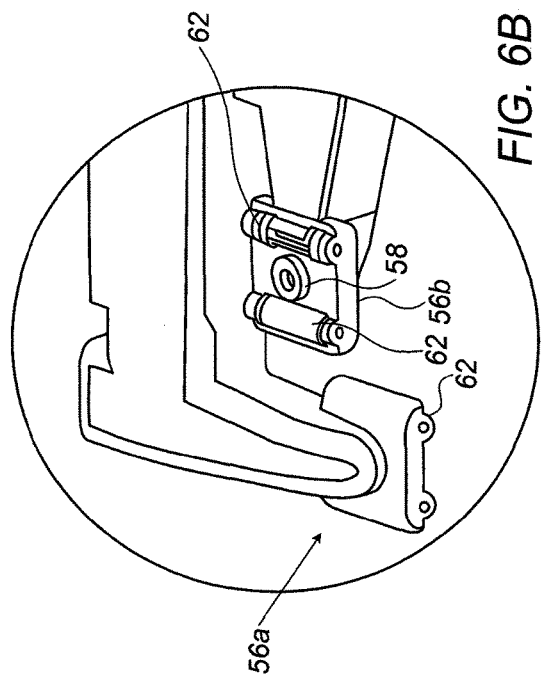
FIG. 6B is an enlarged view of a region of FIG. 6A.

Each backwash arm 54a, 54b terminates in a suction head 56a, 56b, shown more clearly in the enlarged view of FIG. 6B, which includes a nozzle 58 in facing relation to one of the first and second filter screens. Specifically, in the arbitrary orientation illustrated in FIGS. 6A and 6B, the nozzle of suction head 56a faces into the page for backwash cleaning of a second screen surface of a first filter disk while nozzle 58 of suction head 56b faces out of the page for backwash cleaning of a first screen surface of a second filter disk. At each end of the stack of filter disks, a single backwash arm is provided to clean the outward facing surface while the other point of connection for a backwash arm is plugged.

In order to allow intimate contact of each suction head 56a, 56b with its corresponding filter screen, each backwash arm 54a, 54b preferably includes a pivot arrangement 60 providing sufficient range of motion of the backwash arm to allow the suction head to come into close contact with, and follow any undulations in, the corresponding one of the first and second filter screens. Pivot arrangement 60 is illustrated here as a pivotal interconnection through which a flexible hose (not visible) passes to provide the suction connection. Most preferably, inherent resilience of the flexible hose and/or a separate spring element act as a biasing arrangement, pressing the suction nozzle towards the corresponding filter screen. In the example illustrated here, a biasing arrangement of backwash arm 54a tends to bias the arm into the page as shown, while a biasing arrangement of backwash arm 54b tends to bias the arm out of the page as shown.

It should be noted that the specific example of two backwash arms pivoted near their connections to the backwash exhaust conduit 52 is only one of a large number of possible implementations which may be used to provide a similar functionality according to the teachings of the present invention. For example, alternative implementations employ a single backwash arm from which a pair or oppositely biased branches carrying suction heads 56a and 56b project. All such variants fall within the scope of this aspect of the present invention.

This biasing plus the backwash suction help to maintain intimate contact between the suction heads 56a, 56b and the corresponding filter screen surfaces, despite any undulations or variations of those surfaces. However, direct rubbing of the nozzles against the screen would likely cause unduly rapid wear of the nozzle and/or the screen. To minimize such wear, according to certain particularly preferred implementations of the present invention, each suction head includes at least one rotatable roller 62 deployed to provide rolling contact of the suction head with the corresponding first or second filter screen. The rollers are deployed to maintain a near-zero spacing between the filter screen and the nozzle while preventing application of significant frictional contact against the nozzle.

In a particularly preferred implementation as shown in FIG. 6B, a roller 62 deployed ahead of nozzle 58 in the direction of movement across the filter screen is deployed as a split roller with a central spacing or an asymmetrically deployed single roller which avoids pressing particles in the line of cleaning of the nozzle against the screen. The rear roller may be a full cylindrical roller.

Figure 12:
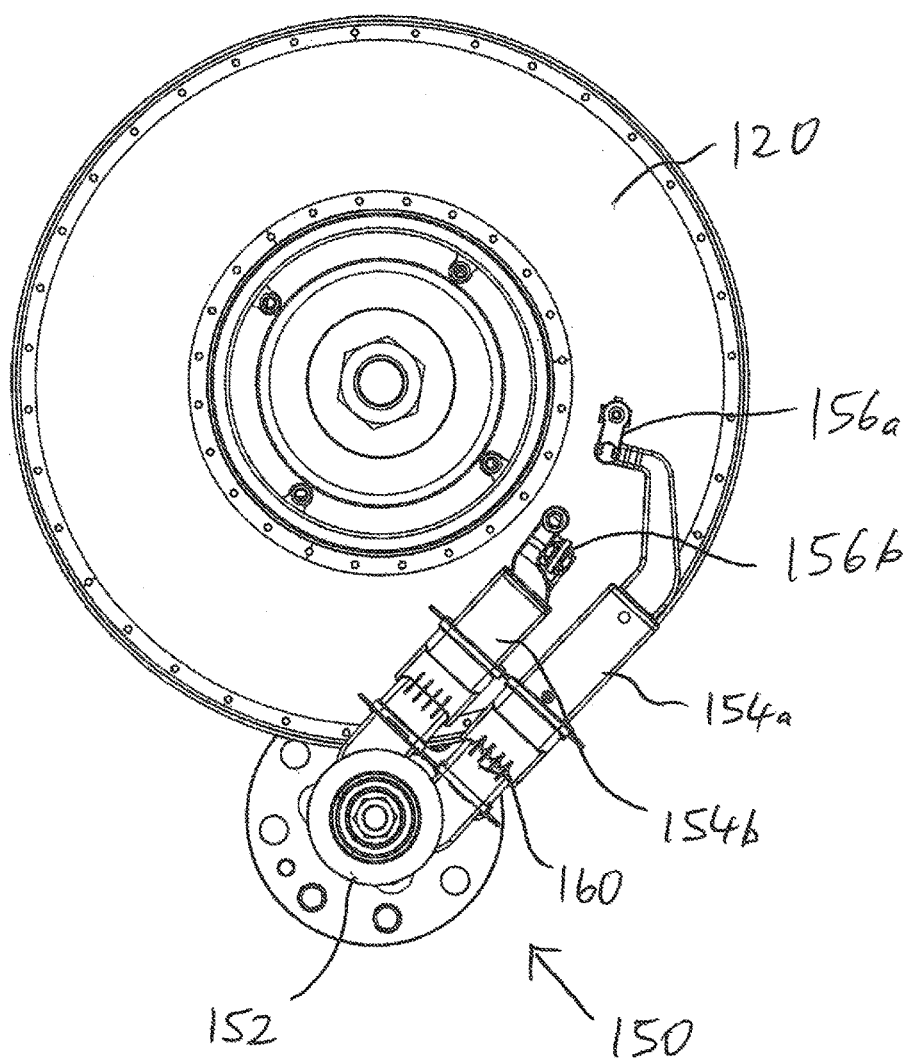
FIG. 12 is an axial view of a filter disk and a backwash assembly from the filter of FIG. 8.
Figure 13A:
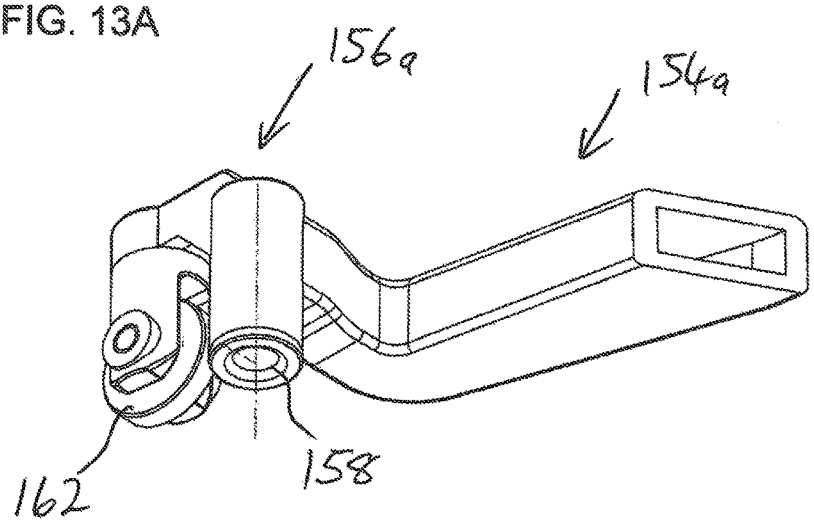
FIGS. 13A and 13B are an isometric view and a side view, respectively, or part of one of the backwash arms from the backwash assembly of FIG. 12.
Figure 13B:
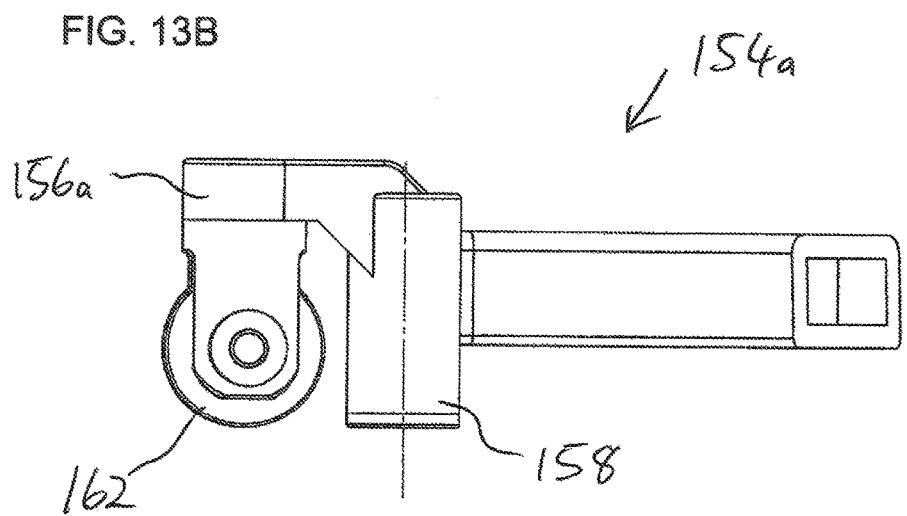

FIGS. 12, 13A and 13B illustrate a variant implementation of a backwash assembly 150 which is generally similar in structure and function to backwash assembly 50 described above, again, with equivalent elements labeled similarly with addition of 100 to the reference numerals. In this case, roller 162 is implemented as a relatively large roller, typically of diameter at least twice, and preferably at least three times, an internal diameter of nozzle 158. Roller 162 is preferably made from a wear-resistant non-abrasive material, such as for example UHMWPE. Particularly where a metal filter screen is used, the choice of a relatively large roller plus a suitable wear-resistant material help to reduce wear on the roller as it passes over the highly abrasive surface of the filter screen.

Additionally, in order to approach zero clearance of nozzle 158 from the filter screen during the lifetime of the backwash arm, a terminal portion of nozzle 158 is preferably formed with a cylindrical end portion of substantially constant cross-section such that the properties of the nozzle are unchanged by gradual wear of the nozzle tip. Specifically, abrasion of the nozzle tip typically occurs initially until the nozzle is level with the roller and the roller takes the contact load against the filter screen. Additionally, if roller 162 becomes gradually more worn, nozzle 158 is correspondingly slightly abraded without changing its geometry to maintain near-zero clearance between the nozzle and the filter screen.

Figure 7:
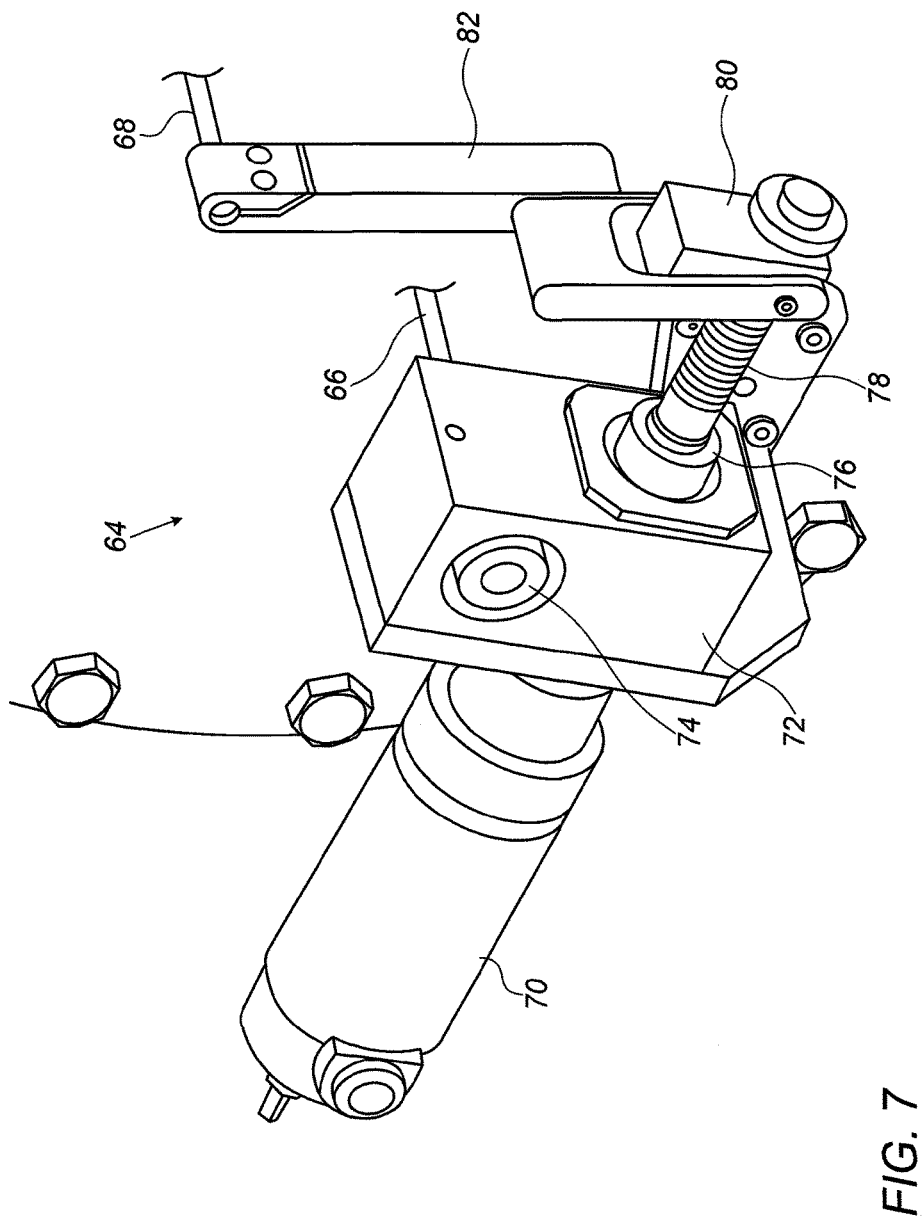
FIG. 7 is an isometric view of an implementation of a drive arrangement for the backwash assembly of FIG. 1.

The backwash assembly is operated by a drive arrangement, generally designated 64 in FIG. 7, which is configured to simultaneously rotate the filter assembly 18 about its central axis and to displace backwash arms 54b, 54b to-and-fro so that the suction nozzles move through a range of radial positions on the filter disk. The combined result of these two motions is that each suction nozzle 58 follows a spiral tracking motion across the corresponding surface of one of the filter disks so as to achieve full coverage of each filter disk screen surface.

As seen in FIGS. 1 and 8, filter 10 preferably provides an externally accessible linkage 66 for turning the primary axis of the filter disk stack and externally accessible linkage 68 for turning the support structure for the backwash arms. In this case, the support structure for the backwash arms is the backwash exhaust conduit 52 itself. Optionally, each linkage 66, 68 can be provided with its own drive components, controlled by a common control system which synchronizes their motion. More preferably, in order to minimize the need for additional position sensors and control components, drive arrangement 64 is configured to generate rotation of the filter assembly and reciprocating motion of the suction nozzle from unidirectional rotation of a single motor. A preferred example of such an implementation is illustrated in FIG. 7.

Specifically, drive arrangement 64 as illustrated here includes a motor 70 connected to a step-down transmission unit 72 which has a first rotary output 74 in driving engagement with linkage 66 and a second rotary output 76. Second rotary output 76 drives a cam shaft 78 with an endless helical groove followed by a crescent-shaped cam-follower (not visible) within a reciprocating block 80. This mechanism, used in various contexts and disclosed in documents such as U.S. Pat. No. 4,535,642 (from 1985) convert continuous rotary output from transmission unit 72 into reciprocating linear motion of block 80 at a generally uniform speed. Block 80 is linked via an actuator arm 82 to linkage 68 so that linear reciprocating motion of block 80 generates rotary reciprocal movement of the backwash assembly. The output ratios of outputs 74 and 76 together with the angle of the helical groove of cam shaft 78 are chosen, together with the other geometrical properties of the filter disks and the backwash assembly, to ensure that nozzles 58 follow a shallow-angle spiral path across the surface of the filter screens so that the swath swept by the nozzles provides full coverage for the filter screen surface.

Depending upon the operating conditions of filter 10, backwash assembly 50 may operate continuously or intermittently. Where intermittent operation is sufficient, a valve arrangement (not shown) cuts off flow through backwash exhaust conduit 52 while the backs ash arrangement is not operating. Actuation of the backwash arrangement may be according to a predefined schedule and/or may be triggered when needed based, for example, on output from pressure sensors detecting a pressure drop across the filter screen (e.g., between the inlet pressure and the outlet pressure) greater than a certain threshold value.

Under normal conditions, backwash of the filter is performed sufficiently frequently to avoid significant clogging of the filter screen and thus to avoid major pressure build-up on the filter disks. Under typical working conditions, a pressure differential across the filler screens should be less than about 0.4 bar. Optionally, as an additional safeguard to the integrity of the structure, a pressure release valve 88 (FIG. 2) may be included. Pressure release valve 88 is normally closed, but is responsive to an excess pressure differential above some threshold value, preferably set at a given value in the range of 0.5 bar to 1 bar, to open a bypass flow path which circumvents the filter screen. In the case illustrated in FIG. 2, valve 88 is located on central flow path 22 at the end furthers from outlet 16. Alternatively, the pressure release valve may be at another location on central flow path 22, such as adjacent to outlet 16, or may be an entirely independent, or even external, bypass flow path between the inlet and outlet pipelines of the filter.

Finally, returning to FIG. 6A, it will be noted that the preferred implementation of the backwash assembly as illustrated here employs a modular arrangement in which a segment of backwash exhaust conduit 52 is integrated with each pair of backwash arms 54a, 54b. Here too, this facilitates modular assembly and servicing of a backwash assembly from a pool of standard parts for different filter installations with different numbers of filter disks.

It will be appreciated that the above descriptions are intended only to serve as examples, and that many other embodiments are possible within the scope of the present invention as defined in the appended claims.

What is claimed is:

1. A filter for filtering a flow of liquid, the filter comprising:
    (a) a pressure vessel having an inlet and an outlet;
    (b) a filter assembly deployed within said pressure vessel, said filter assembly comprising a plurality of filter disks coaxially arrayed along a central flow path in fluid communication with said outlet, said filter assembly being rotatably mounted to as to be rotatable about a central axis, each of said filter disks comprising a spacer having first and second outward-facing filter screen support configurations, and having an outlet for flow of filtered liquid inwards to said central flow path, said first and second filter screen support configurations of said spacer supporting first and second filter screens forming corresponding first and second surfaces of each filter disk; and
    (c) a backwash assembly comprising:
        (i) a backwash arm extending between adjacent of said plurality of filter disks, said backwash arm terminating in a suction head comprising a suction nozzle in facing relation to one of said first and second filter screens and at least one rotatable roller deployed to provide rolling contact with said one of said first and second filter screens;
        (ii) a pivot arrangement for accommodating motion of said backwash arm so as to bring said suction nozzle into close contact with said one of said first and second filter screens; and
        (iii) a drive arrangement configured to simultaneously rotate said filter assembly about said central axis and displace said backwash arm so that said suction nozzle moves through a range of radial positions on said filter disk, thereby causing said suction nozzle to follow a spiral tracking motion across a surface of said filter disk.

2. The filter of claim 1, wherein said filter screen support configurations have a cellular form that is open over a majority of a surface area, the spacer further comprising an arrangement of support ribs deployed to maintain a spacing between said first and second filter screen support configurations.

3. The filter of claim 2, wherein at least 20 percent of an internal volume of each of said spacers is open to allow liquid flow from said screens to said central flow path.

4. The filter of claim 2, wherein said first outward-facing filter screen support configuration of each of said spacers is formed from at least one half-thickness first spacer segment, and wherein said second outward-facing filter screen support configuration of each of said spacers is formed from at least one half-thickness second spacer segment, said first and second spacer segments having complementary sets of said support ribs cooperating when assembled to maintain said spacing between said first and second filter screen support configurations.

5. The filter of claim 4, wherein each of said spacers is formed from a single annular first spacer segment and a single annular second spacer segment.

6. The filter of claim 4, wherein each of said spacers is formed from a plurality of first spacer segments and a plurality of second spacer segments.

7. The filter of claim 2, wherein said filter screen support configurations are formed with a quadrilateral or hexagonal cellular form.

8. The filter of claim 2, wherein said first and second filter screens are attached to said filter disks only around a periphery of said filter screens.

9. The filter of claim 1, wherein said backwash arm is one of a pair of backwash arms inserted between a pair of adjacent filter disks, and wherein said pivot arrangement is configured to accommodate motion of a first of said backwash arms to contact a second filter screen of a first filter disk and a second of said backwash arms to contact a first filter screen of a second filter disk.

10. The filter of claim 1, wherein said drive arrangement is configured to generate rotation of said filter assembly and reciprocating motion of said suction nozzle from unidirectional rotation of a single motor.

11. The filter of claim 1, wherein said pivot arrangement comprises a biasing arrangement deployed for biasing said backwash arm so as to press said suction nozzle towards said one of said first and second filter screens.

* * * * *